United States Patent
Elwell et al.

(10) Patent No.: US 9,381,469 B2
(45) Date of Patent: *Jul. 5, 2016

(54) RADIAL SPLIT RING SEAL FOR FILTRATION SYSTEMS

(71) Applicant: TORAY Industries, Inc., Chuo-ku, Tokyo (JP)

(72) Inventors: Curtis J. Elwell, El Cajon, CA (US); Frederick K. Lesan, Encinitas, CA (US); Victor Verbeek, Sydney (AU); Peter F. Metcalfe, San Marcos, CA (US)

(73) Assignee: TORAY INDUSTRIES, INC., Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 14/308,448

(22) Filed: Jun. 18, 2014

(65) Prior Publication Data

US 2014/0299533 A1 Oct. 9, 2014

Related U.S. Application Data

(63) Continuation of application No. 13/913,959, filed on Jun. 10, 2013, now Pat. No. 8,758,489, which is a continuation of application No. 12/902,424, filed on Oct. 12, 2010, now Pat. No. 8,728,213.

(60) Provisional application No. 61/250,771, filed on Oct. 12, 2009, provisional application No. 61/250,765, filed on Oct. 12, 2009.

(51) Int. Cl.
*B01D 65/00* (2006.01)
*B01D 63/10* (2006.01)
(Continued)

(52) U.S. Cl.
CPC .............. *B01D 65/003* (2013.01); *B01D 63/10* (2013.01); *B01D 63/106* (2013.01); *B01D 63/12* (2013.01); *F16J 15/04* (2013.01)

(58) Field of Classification Search
CPC .... B01D 63/10; B01D 63/106; B01D 65/003; F16J 15/441; F16J 15/442; F16J 9/14
See application file for complete search history.

(56) References Cited

U.S. PATENT DOCUMENTS 3,097,855 A 7/1963 Allen
3,235,274 A 2/1966 Cain, Jr. et al.
(Continued)

FOREIGN PATENT DOCUMENTS

EP 0141201 A1 5/1985
EP 0188224 A2 7/1986
(Continued)

OTHER PUBLICATIONS

PCT/US2010/052340 International Search Report, PCT/ISA/210, Dec. 6, 2010, pp. 1-2.

(Continued)

*Primary Examiner* — Robert Clemente
(74) *Attorney, Agent, or Firm* — Pillsbury Winthrop Shaw Pittman LLP

(57) ABSTRACT

A radial seal is described for use in a filtration system having annular elements. The rings or annuli fit in a groove in an outer surface of a seal plate. Each annulus has an outer diameter larger than the inner diameter of a cylindrical housing of the filtration system. A gap in the annulus has a width selected to enable the annular element to deform sufficiently to permit insertion of the at least one annulus into the cylindrical housing. Two or more annuli can be configured such that the gaps of the annuli are misaligned when both annuli are installed in the groove, thereby minimizing leakage in operation. A registration system includes a registration element that cooperates with a registration element of the other annulus to ensure misalignment of the gaps of the pair of annuli.

10 Claims, 5 Drawing Sheets

(51) Int. Cl.
*F16J 15/04* (2006.01)
*B01D 63/12* (2006.01)

(56) References Cited

U.S. PATENT DOCUMENTS

| | | | |
|---|---|---|---|
| 4,047,743 A | 9/1977 | Weintraub et al. |
| 4,102,608 A | 7/1978 | Balkau et al. |
| 4,165,203 A | 8/1979 | Latzina et al. |
| 4,189,161 A | 2/1980 | Grimm |
| 4,199,156 A | 4/1980 | Oldham et al. |
| 4,204,690 A | 5/1980 | Holland et al. |
| 4,643,440 A | 2/1987 | Massey, Jr. |
| 4,840,379 A | 6/1989 | Thoman, Jr. |
| 4,906,372 A | 3/1990 | Hopkins |
| 4,911,840 A | 3/1990 | Underwood |
| 5,389,260 A | 2/1995 | Hemp et al. |
| 5,470,469 A | 11/1995 | Eckman |
| 5,554,283 A | 9/1996 | Brinda et al. |
| 5,762,788 A | 6/1998 | Gullett |
| 5,851,267 A | 12/1998 | Schwartz |
| 5,891,334 A | 4/1999 | Gundrum et al. |
| 5,934,680 A | 8/1999 | Kakehi et al. |
| 5,992,518 A | 11/1999 | Whitlock |
| 6,224,767 B1 | 5/2001 | Fujiwara et al. |
| 6,235,194 B1 | 5/2001 | Jousset |
| 6,500,335 B2 | 12/2002 | Janik et al. |
| 6,615,990 B1 | 9/2003 | Jokschas et al. |
| 6,632,356 B2 | 10/2003 | Hallan et al. |
| 6,656,362 B1 | 12/2003 | Kihara et al. |
| 6,692,639 B1 | 2/2004 | Spearman et al. |
| 6,715,767 B1 | 4/2004 | Meernik et al. |
| 6,830,683 B2 | 12/2004 | Gundrum et al. |
| 7,063,789 B2 | 6/2006 | Colby et al. |
| 7,147,110 B2 | 12/2006 | Clausen et al. |
| 7,168,573 B2 | 1/2007 | Brown et al. |
| 7,172,697 B2 | 2/2007 | Chikura et al. |
| 7,198,719 B2 | 4/2007 | Chikura et al. |
| 7,267,330 B1 | 9/2007 | Fleming et al. |
| 7,341,256 B2 | 3/2008 | Nakaoka et al. |
| 7,387,731 B2 | 6/2008 | Colby et al. |
| 7,396,463 B2 | 7/2008 | Moller |
| 7,628,280 B2 | 12/2009 | Mandt et al. |
| 7,682,507 B2 | 3/2010 | Stamey, Jr. et al. |
| 7,749,382 B2 | 7/2010 | Chikura et al. |
| 7,766,339 B2 | 8/2010 | Umetsu et al. |
| 7,771,595 B2 | 8/2010 | Reynolds et al. |
| 7,867,394 B2 | 1/2011 | Uda et al. |
| 7,910,000 B2 | 3/2011 | Chikura et al. |
| 8,758,489 B2 * | 6/2014 | Elwell .................. B01D 63/106 210/321.74 |
| 2003/0024868 A1 | 2/2003 | Hallan et al. |
| 2004/0200770 A1 | 10/2004 | Clary |
| 2007/0222162 A1 | 9/2007 | Stoner |
| 2008/0224416 A1 | 9/2008 | Carmody |
| 2008/0252019 A1 | 10/2008 | Yu |
| 2009/0079137 A1 | 3/2009 | Cross |
| 2011/0084013 A1 | 4/2011 | Lesan et al. |
| 2011/0135445 A1 | 6/2011 | Turnquist et al. |
| 2011/0174713 A1 | 7/2011 | Shelby et al. |
| 2012/0112415 A1 | 5/2012 | Benjamin et al. |

FOREIGN PATENT DOCUMENTS

| | | |
|---|---|---|
| JP | 2009189947 A | 8/2009 |
| NL | 1031276 C1 | 3/2006 |
| WO | 03101594 A1 | 12/2003 |

OTHER PUBLICATIONS

Japanese Office Action dated Oct. 16, 2012 of Japanese Application No. 2012-533391 (4 pages) with a partial English translation (3 pages).
International Application No. PCT/US2011/021552, Written Opinion dated Jul. 15, 2012.
DMR Quad-Ring Seals Brochure, print-out from website www.daemar.com, date unknown.
"TORAY", TORAYSEAL Brochure, print-out from website www.toraywater.com, date unknown.
"TORAY", TORAYSEAL Axial Brochure, print-out from website www.toraywater.com, Apr. 14, 2011.
International Application No. PCT/US2011/021552, International Preliminary Examination Report dated Jul. 15, 2012.

* cited by examiner

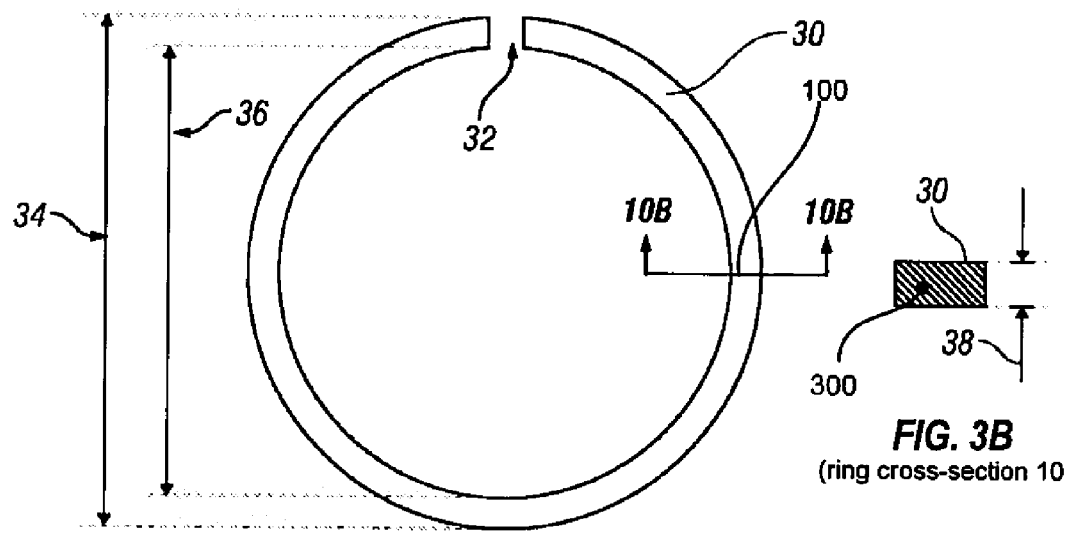
FIG. 3A
FIG. 3B
(ring cross-section 10B)
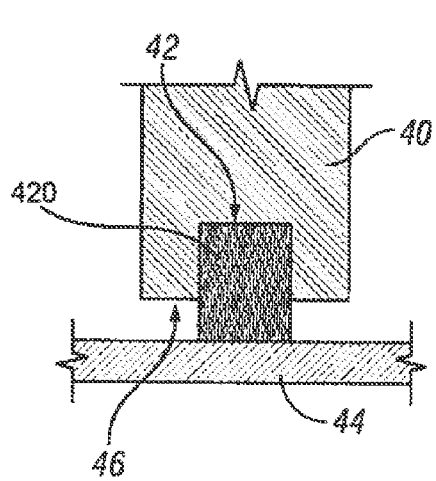
FIG. 4A
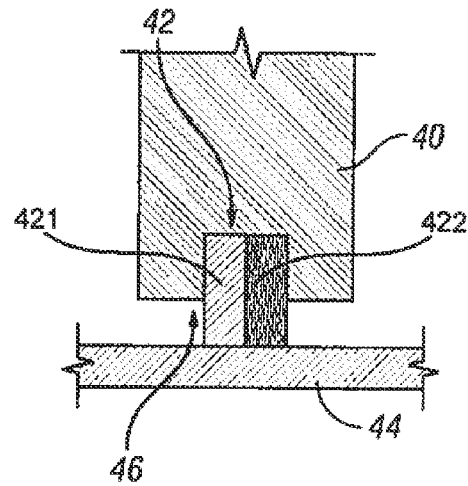
FIG. 4B

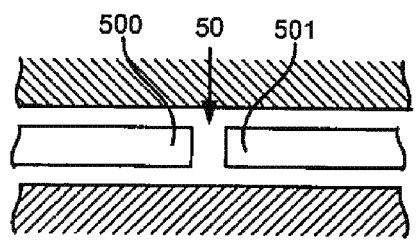
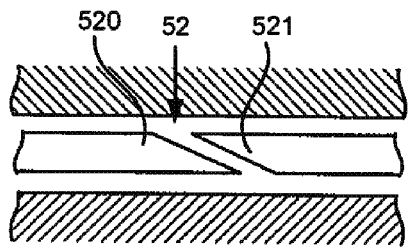
FIG. 5A
FIG. 5B
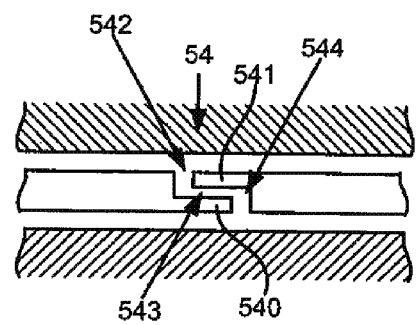
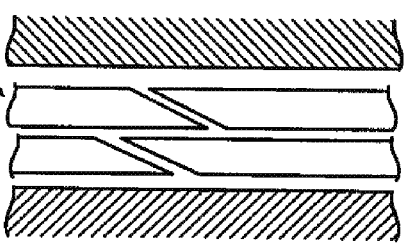
FIG. 5C
FIG. 5D
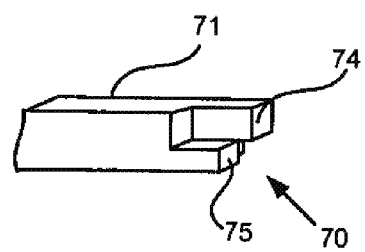
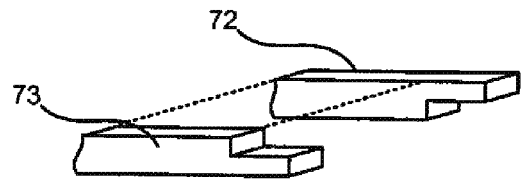
FIG. 7A
FIG. 7B
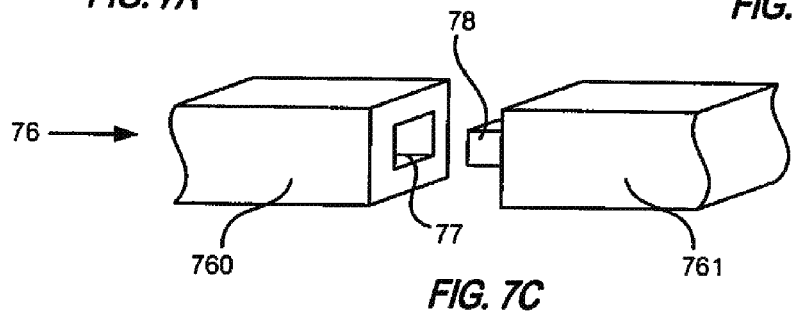
FIG. 7C

RADIAL SPLIT RING SEAL FOR FILTRATION SYSTEMS

CROSS-REFERENCE TO RELATED APPLICATIONS

This application is Continuation of U.S. application Ser. No. 13/913,959, filed Jun. 10, 2013, which is a Continuation of U.S. application Ser. No. 12/902,424, filed Oct. 12, 2010, now U.S. Pat. No. 8,728,213, which claims priority from U.S. Provisional Patent Application No. 61/250,771 filed Oct. 12, 2009, entitled "Radial Split Ring Seal For Filtration Systems," and from U.S. Provisional Patent Application No. 61/250,765 filed Oct. 12, 2009, entitled "Axial Labyrinth Seal for Filtration Systems, which applications are expressly incorporated by reference herein for all purposes.

BACKGROUND OF THE INVENTION

1. Field of the Invention

The present invention relates generally to membrane filtration systems and more particularly to seals used in spiral membrane elements of filtration systems.

2. Description of Related Art

Certain types of filtration systems used for removing chemical contaminants and organisms from water comprise one or more filtration elements that are sealed within an enclosure. The enclosure may comprise a canister, a drum and/or a pipe. In particular, filtration systems used for large-scale water treatment can include a series of elements that connect together within a pipe like structure and which direct an inflow of contaminated or impure water through a filter material and onto an outflow pipe or channel. In the example shown in FIG. 1, filtration element 11 in a spiral membrane filtration system comprises a membrane structure that is wound in a spiral. In FIG. 1, permeate carrier sheet 18 is laminated within an envelope of a membrane filtration sheet 19 and adjacent layers are separated by feed spacers 101 and typically enclosed within a hard shell or wrapping to prevent leakage of the inflow and to provide a degree of mechanical stability and strength to filtration element 11. Filtration elements, such as spiral membrane filtration element 11, are typically provided in a substantially cylindrical form and one or more filtration elements 11 can be installed end-on-end within a housing 10 (as shown in FIG. 1C). An inflow fluid 140 is introduced through an inlet under pressure into an end of the system, and enters filtration element 11 at one end 140 and, having passed through membrane 19, exits either as a permeate stream 143, typically through a center pipe or channel 13, or as a concentrate stream 144 which exits from the membrane filtration device. The center pipe 13 is typically coaxial with the enclosure 10 and coupled or otherwise connected with the membrane 19 in a manner that permits collection of the permeate 143. Permeate 143 can be drawn from the system in either direction.

These filtration elements function as membrane filters. Unlike conventional batch mode filtration systems, the described filtration system operates as continuous steady state process. As such the total of all material entering in the feed stream 15 is substantially equal to the summation of all material leaving the filtration device in the two exit streams 143 and 144. Such systems may be used in applications that deliver drinking water, clean or treat wastewater and/or storm water, extract water from sludge, and/or desalinate water such as sea water; in these applications, the dilute permeate stream 143 is the principal product of the system. Conversely the concentrate stream 144 may provide the principal product where the objective is to recover or concentrate a valuable solute.

Spiral membrane elements 11 are used as a means of packaging flat sheet, reverse osmosis membrane 19 in useful separation applications. These elements are typically loaded end to end in a cylindrical housing 10 as shown in FIG. 1C. Process feed flow 140 is introduced at one end of the housing and flows axially 141 through the element 11, with some portion 142 passing through the filter medium 19 to a center collection channel or pipe system 13 from which it is provided as an outflow 143. The concentrated remnant 144 is drawn from a first element 11 into a second element 11 and so on. Concentrate 144 extracted from the system can be processed externally and/or recycled through the system based on system configuration and function. It is necessary to provide a sealing mechanism between successive spiral elements 11 that insures concentrate stream 144 from the first element 11 is passed as a feed stream 140 to the subsequent spiral membrane filtration element 11.

This sealing mechanism can be accomplished using seal plates 12 (shown in more detail in FIG. 1B) that are attached to each end of each spiral element 11. In conventional systems, elastomeric seals are placed in a groove 16 located on an external edge of seal plate 12, in order to prevent escape of fluid into a space between element 11 and housing or vessel 10. Couplings 130 connect successive center channels 13 are typically also sealed using elastomeric seals.

An additional seal 120 may be required between the spiral element 11 and the inner wall of the cylindrical housing 10 to direct the flow 140 into the element 11 itself rather than the annular space between the element 11 and the housing 10. If the flow 140 were not directed primarily into the element structure the velocity of the feed flow over the membrane sheet would be reduced which would impact the separation performance of the membrane sheet. Conventional systems provide an elastomeric seal in a circumferential grooved depression 16 located on the outer surface of a seal plate 12 as shown in sectional FIG. 2A. A commonly used elastomeric seal 24 is shaped in a cup form as shown in FIG. 2B which creates an effective seal but requires that the element be inserted into the housing in one direction as the seal cannot be pushed a reverse direction. A symmetrical elastomeric seal such as an O-ring 26 could be used within the element seal late groove as sown in FIG. 2C. This permits movement in either direction but relies on a greater amount of deformation of elastomeric seal in order to function as an effective seal. This results in greater force needed to insert the element into the cylindrical housing and is the principal reason for the preference for the cupped shaped elastomeric seal.

BRIEF SUMMARY OF THE INVENTION

A radial seal for a filtration system comprises one or more annulus having an outer circumference and an inner circumference and a thickness. Each annulus may have a diameter of the inner circumference that fits in a groove in an outer surface of a seal plate and each annulus has a diameter of the outer circumference selected to be larger than the diameter of an inner surface of a cylindrical housing that receives the seal plate. A gap in the annulus of the ring centered along a radius of the at least one annulus has a width selected to enable the annular element to deform sufficiently to permit insertion of the at least one annulus into the cylindrical housing.

The inner and outer diameters of the annuli and the width of the gap may be selected to obtain a tight fit between the outer circumference of the at least one annulus and the inner surface of the cylindrical housing. The tight fit is maintained by a restoring force reactive to compression of the annular element, the magnitude of the restoring force being related to the width of the gap and the materials used to fabricate the at least one annulus. The width of the gap can be selected to permit a controlled degree of leakage when an annulus is installed in the groove and the seal plate is inserted in the cylindrical housing.

In some embodiments, the seal comprises two or more annuli configured such that the gaps of the annuli are misaligned when the annuli are installed in the groove, thereby minimizing leakage in operation. A registration system includes a registration element that cooperates with a registration element of the other annulus to ensure misalignment of the gaps of the pair of annuli. The registration system can comprise a raised element provided on a surface of one of pair of annuli that fits in the gap of an adjacent annulus and/or a raised element provided on a surface of one of pair of annuli that fits in a groove provided on a surface of an adjacent annulus.

Methods for sealing a spiral membrane element inserted into a cylindrical housing of a filtration system are provided. A method according to certain aspects of the invention includes steps of providing at least one split ring seal in a groove located on an outer surface of a seal plate of the spiral membrane element, inserting the seal ring into the cylindrical housing, including inserting the seal ring includes a step of compressing the at least one split ring seal.

BRIEF DESCRIPTION OF THE DRAWINGS

FIG. 3A shows a seal element according to certain aspects of the invention.

FIG. 3B shows a profile of seal element of FIG. 3A.

FIGS. 4A and 4B shows, in cross-section, one or more seal elements according to certain aspects of the invention provided in the groove of a seal plate.

FIGS. 5A-5D show examples of split ring seals with a variety of gap profiles according to certain aspects of the invention.

FIGS. 7A-7C show examples of seals having compound gap profiles according to certain aspects of the invention.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Figure 1A:
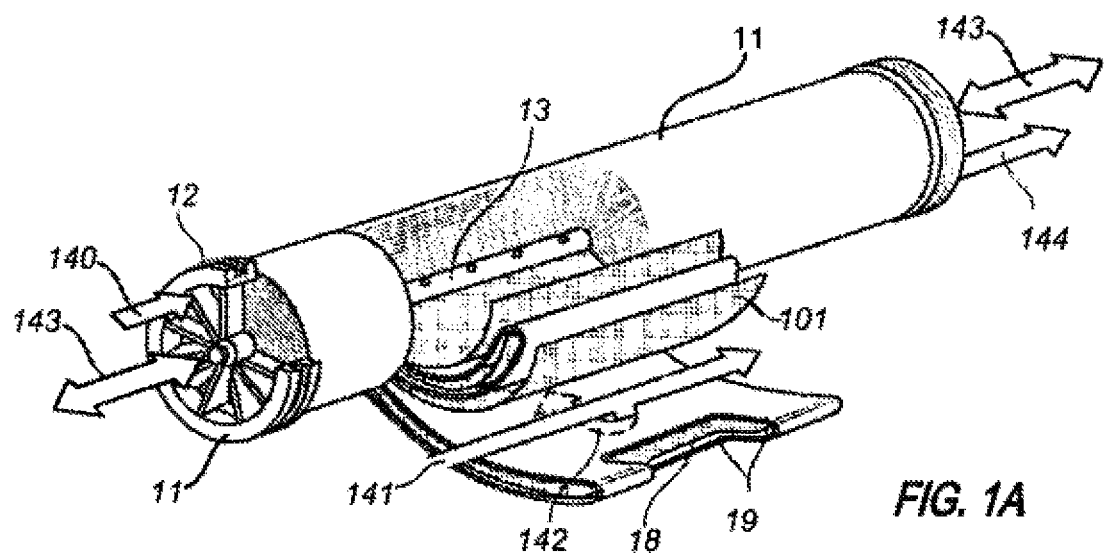
FIGS. 1A-1C illustrates a filtration system that includes a plurality of sealed filtration elements.
Figure 1B:
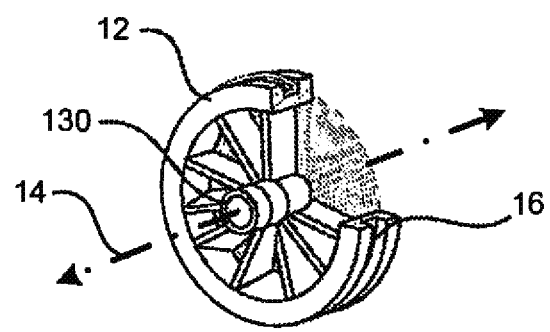
Figure 1C:
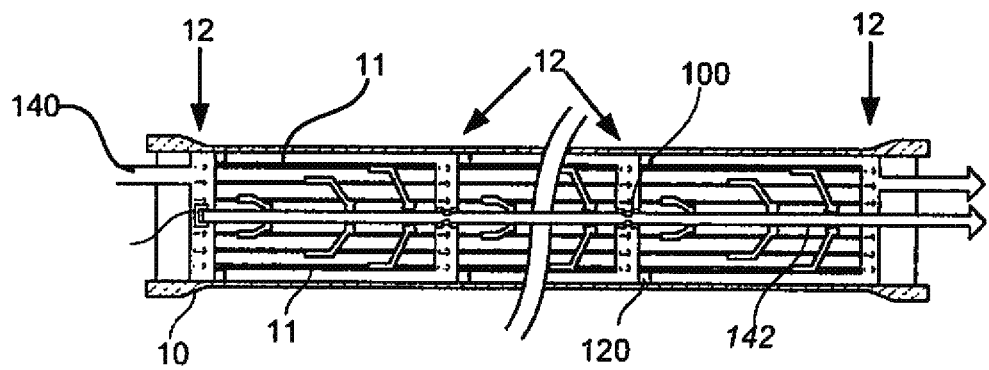

Certain embodiments of the invention provide a seal element for filtration systems. The presently disclosed seal can be constructed with dimensions that allow it to serve as a substitute for conventional elastomeric seals, including O-ring, chevron and U cup seals and the like. With reference again to FIGS. 1A-1C, certain embodiments of the invention comprise a split-ring seal that may be fitted to a conventional seal plate 12, in a radial groove 16 that would otherwise receive a compressible elastomeric seal. As will be described in more detail below, the presently disclosed split ring seal is typically constructed using materials selected for rigidity, elasticity, inertness, ability to withstand operational temperature ranges, ability to withstand operational pressures and coefficient of friction with materials used in construction of a filtration system (e.g. inner surface of housing 10). Materials can be selected according to the application and, for example, seals constructed according to certain aspects of the invention can be used in 8-inch or 16-inch filtration systems in which conventional elastomeric seals are unable to withstand the water pressures involved.

In one example described herein, an annular seal 30 (see FIGS. 3A and 3B), formed from a substantially non-compressible polymer, can be placed in a groove 16 of an outer surface of a seal plate 12. The seal 30 has a gap 32 in its annulus and the annular shape can be deformed under pressure by applying a force that closes gap 32. Such force is applied when seal plate 12, with seal 30 installed, is inserted into a housing 10. Seal 30 acts as a spring, causing an outer surface of ring 30 to create a tight interface with an inner surface of the housing 10. Some portion of gap 32 in ring seal 30 may remain open when seal plate 12 is located within housing 10. In some embodiments, such gap is desirable because, if sized appropriately, gap 32 can limit and/or equalize pressure differences on either side of seal 30. In certain embodiments however, a more watertight seal is desired and a second split-ring seal 30 may be placed in groove 16 such that the gaps 32 in seals 30 are offset. Other variations on the latter theme will be described in more detail herein.

FIGS. 3A-3B and 4A-4B relate to a simple example of a seal according to certain aspects of the invention. The annular seal of FIGS. 3A-3B and 4A-4B can be fitted to an outer portion 40 of a seal plate 12 and/or can be used to create a seal between concentric elements, typically between substantially cylindrical surfaces of the elements. Seal 30 can be used as a replacement for conventional elastomeric seals. For example, the dimensions of rigid ring 30 can be configured to permit ring 30 to replace conventional O-ring or U-cup seals commonly installed in radial grooves 16 in seal plates 12 of spiral membrane filtration elements. Width 38 of the ring seal 30 may be selected to permit a desired number of seals 30 to be placed in groove 16 of existing seal plates 12. FIG. 4A shows an embodiment in which a single seal 420 is disposed in groove 42, while FIG. 4B relates to an embodiment in which two rings 421 and 422 are provided within groove 42. Split ring seal 30 can also be used in more demanding applications where, for example, the seal 30 will be subjected to high temperatures and/or high pressures, or where the presence of caustic agents requires the use of a non-reactive sealing material. In one example, pressures within a spiral membrane filtration system may preclude the use of certain conventional elastomeric seals. Elastomeric seals commonly used in four-inch diameter spiral membrane systems typically cannot be scaled to operate in 8-inch or 16-inch systems because of the increase operational pressures and because of the increased difficulty of installation and removal of sealed elements caused by exponentially increased frictional forces attributable to the increase in contact area of the conventional elastomeric seal with a housing 10.

Certain embodiments of the invention comprise a rigid split-ring seal 30 suitable for use in filtration systems. Seal plates 12 are generally circular in shape, somewhat resembling a wheel, and are configured for insertion into a cylindrical housing 10. A portion 40 of seal plate 12 has an externally, facing radial surface 46 proximate to, and interfacing with an inner surface of enclosure 44. Currently-produced seal plates 40 typically include a groove 42 in externally-facing surface 46 of seal plate 40. A rigid ring 30, 420-422 constructed according to certain aspects of the invention may be installed in such seal plate groove 42. Prior to insertion, the rigid ring 30 can typically be rotated in either direction about the axis 14 of the seal plate 12 (see FIGS. 1A-1C) and gap 32 can be oriented and/or aligned with a feature of the seal plate 12 or housing 10, as desired. The seal plate 12 with seal 30 may be inserted into either end of a cylindrical housing 10 and can be moved along the axis of the cylindrical housing 10 in either direction. It will be appreciated that seal 30 may have a coating or other surface treatment that provides a desired coefficient of friction. Seal 30 can be configured to fit a seal plate 12 that has a non-circular shape and some seals 30 may be used with different shaped seal plates including, for example, circular and oval seal plates, or a somewhat asymmetrical seal plate. In one example, seal 30 may be installed in a groove 16 on a declining radius surface (not shown) and seal ring 30 may have a cross-section that follows the shape of a surface of the seal plate 12 and/or the housing 10.

Figure 2A:
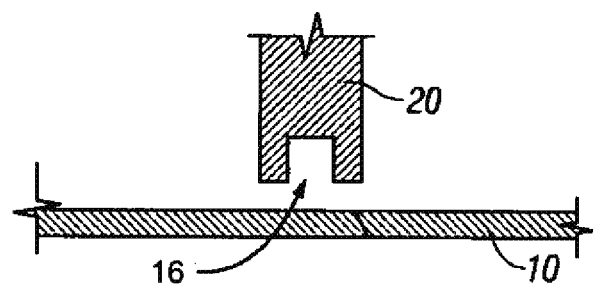
FIG. 2A shows a groove provided in a seal plate and FIGS. 2B-2C show prior art elastomeric seals provided in groove of FIG. 2A.
Figure 2B:
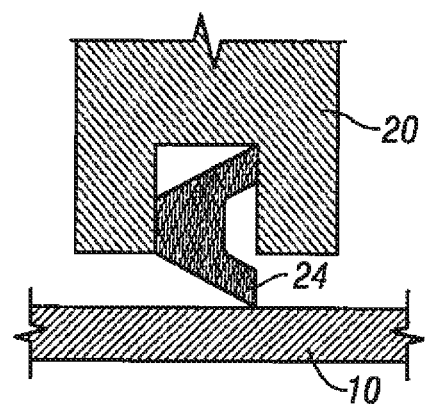
Figure 2C:
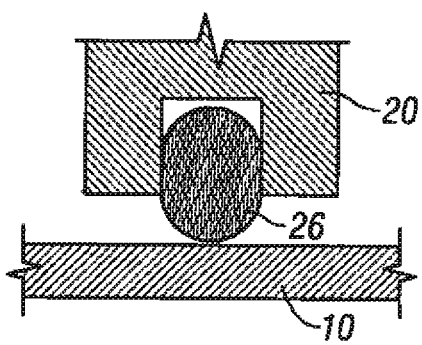

Seal ring 30 is typically constructed from a non-elastomeric material that substantially maintains its cross-sectional shape (e.g. FIG. 3B) under pressure and when a compression force as radially applied to the annulus 30. Under compression, gap 32 in seal ring 30 is reduced when a radial compression force is applied to the seal ring and seal ring 30 is typically configured and constructed with sufficient elasticity to resist closure of gap 32 and to restore its original at-rest annular shape when compression forces are removed. For example, hard and/or hardened polymers, metals, ceramics and other such materials can be used to construct seal ring 30. It will be appreciated that conventional elastomeric seals maximize sealing capabilities by deforming under compression such that the cross-sectional area of the elastomeric seal changes. However, the deformation of conventional elastomeric seals under pressure can limit motion of the seal plate 12 and seal assembly within housing 10 to a single direction. Cross section 20 of seal plate 12 is shown in FIG. 2A-2C. Deformation of a conventional elastomeric cup seal 24 (see FIG. 2B) during insertion typically creates very high resistance to movement in a reverse direction because of the orientation of the U cup legs. The force required to overcome the resistance of conventional elastomeric seals is often insurmountable without causing destruction of these seals. Therefore, a filtration element 11 in an assembled multi-element filtration system (see FIGS. 1A-1C), when fitted with conventional cup seals 24 and inserted into a housing 10 in one direction, can be practicably removed only by forcing the elements completely through the housing in the same direction as used for insertion. Deformation of an O-ring seal 26 typically increases the surface area of seal 26 in contact with the enclosure 10. Therefore, an assembled multi-element structure (see FIGS. 1A-1C), when fitted with 0-ring seals 26 and inserted into a housing, require significant force to insert and remove the elements into the housing.

In contrast, annular seals 30 constructed according to certain aspects of the invention typically do not restrict motion in any direction parallel to axis 14 of seal plate 12. Furthermore, seal 30 can be constructed from a low-friction material and/or the surfaces of seal 30 can be coated or treated in order to reduce frictional forces experienced during insertion and removal of the element. Consequently, a multi-element component may be inserted and extracted with greater ease through the same end of a housing when rigid ring seals 30 according to certain aspects of the invention are used. Moreover, rigid seal rings 30 according to certain aspects of the invention resist deformation under axial pressure from either direction. Accordingly, filtration elements employing the split ring seals 30 disclosed herein can receive and resist bidirectional flows, including reverse flows provided for flushing, cleaning and for other reasons. Conventional seals, including U-cup and chevron seals (see FIG. 2B) often cannot resist reverse flows and must be replaced or reoriented for flushing.

Seal plates 10 that use conventional elastomeric seals require significantly greater force for insertion of the seal plate because of the deformation of the seal material required to form a seal, the angle of engagement of the elastomeric seal, the significant contact pressure required to maintain a seal using elastomeric seals and/or increased contact area of the elastomeric seals. In one example, a seven element component equipped with conventional seal U-cup brine seals 24 (with lubrication) can require the equivalent of 45 pounds of force or more to insert the elements into a housing. It can be shown that an equivalent seven element component fitted with the presently disclosed rigid ring seals 30 can be inserted into a housing using 20 pounds or less of force.

In certain embodiments, dimensions of rigid ring 30 are selected to obtain an efficient seal. The outer diameter 34 of rigid ring 30 is typically selected to be slightly larger than the internal diameter of the cylindrical housing 10, while inner diameter 36 of the annulus 30 is selected to provide a good fit within the groove 42 of seal plate 40. Thickness 38 of annulus 30 may be selected according to application and to fit a desired number of ring seals 30 in the groove 42 to obtain a desired level of tightness of seal. In certain embodiments, more than one ring seal 421 and 422 can be provided in groove 42 for sealing seal plate 40. Multiple ring configurations (FIG. 4B) may be used with gaps in rings 421 and 422 offset from one another to minimize leakage through the seal structure. Multiple ring configurations (FIG. 4B) may be used such that rings 421 and 422 have different thicknesses. In some embodiments, multiple ring configurations comprise different rings 421 and 422 manufactured from different materials.

As seen in FIG. 3, a small portion is removed from the annulus ring 30 to leave a gap 32 in the annulus 30. Gap 32 in rigid split ring 30 tends to close when the ring 30 is compressed to enable insertion into the cylindrical housing 10. The size and shape of the gap 32 can be selected to allow the ring to minimize the gap 32 when the ring is compressed to fit into the cylindrical housing 10. Factors affecting the selection of the size of gap 32 include specified or expected operational temperature swings and coefficients of expansion of materials used to construct the ring 30. Typically, the cross-section 300 of ring 30 does not deform significantly under compression and the force of compression is accommodated by a change in diameter of the ring 30. It is contemplated that, in certain embodiments, it can be desirable to have at least one ring 420, 421 or 422 constructed from materials that include a portion of a deformable material where, for example, it is necessary to accommodate shrinkage and expansion under temperature or pressure and a softer, more deformable ring 421 or 422 can be coupled with a stronger, more rigid ring 422 or 421 to provide a combination of pressure resistance and malleability under operational conditions.

Compression of the rigid ring 30 creates a reactive radial force that causes the ring 30 to maintain contact of the ring with the outer wall of the cylindrical housing 10, thereby creating a seal. This reactive force can create a resistive drag force that resists movement of the seal plate along the axis of the cylindrical housing 10. The amount of reactive force can be controlled by selection of the materials used to construct the rigid ring and by dimensioning the rigid ring. For example, the thickness of the ring 30 and the outer 34 and inner 36 diameters of the annulus 30 can be selected to obtain a desired reactive force. The reactive force and resistivity of material of ring 30 may be selected to permit a certain amount of movement of seal and/or seal plate in order to adjust to expansion and/or compression, of cylindrical housing 10 or the sealed spiral element.

Gap Profiles

The profile of gap 32 may be selected to control flow of fluids past the ring seal 30. Leakage through ring seal 30 typically results in a portion of the unfiltered or contaminated inflow fluid (process feed) passing through the space between successive filtration elements 11 and the system housing 10. Some systems comprise a radial seal installed only on the seal plate 12 of the first filtration element 11 in a series of filtration elements in order to direct the inflow through the filtration elements 11. Downstream seal plates 12 of adjacent filtration elements prevent leakage from the filtration elements 11 into the space between filtration elements 11 and the system housing 10. Unfiltered fluid in the space can be removed and recycled through the system as desired. It can be desirable to allow a degree of leakage through the radial seal 30 into the space to reduce stress on wrapping or shell of the filtration elements caused by a difference in pressure between the space and the interior of the filtration elements 11. Therefore, the profile of gap 32 may be selected to obtain and control a level of leakage that operates to equalize pressure within the system.

Figure 6:
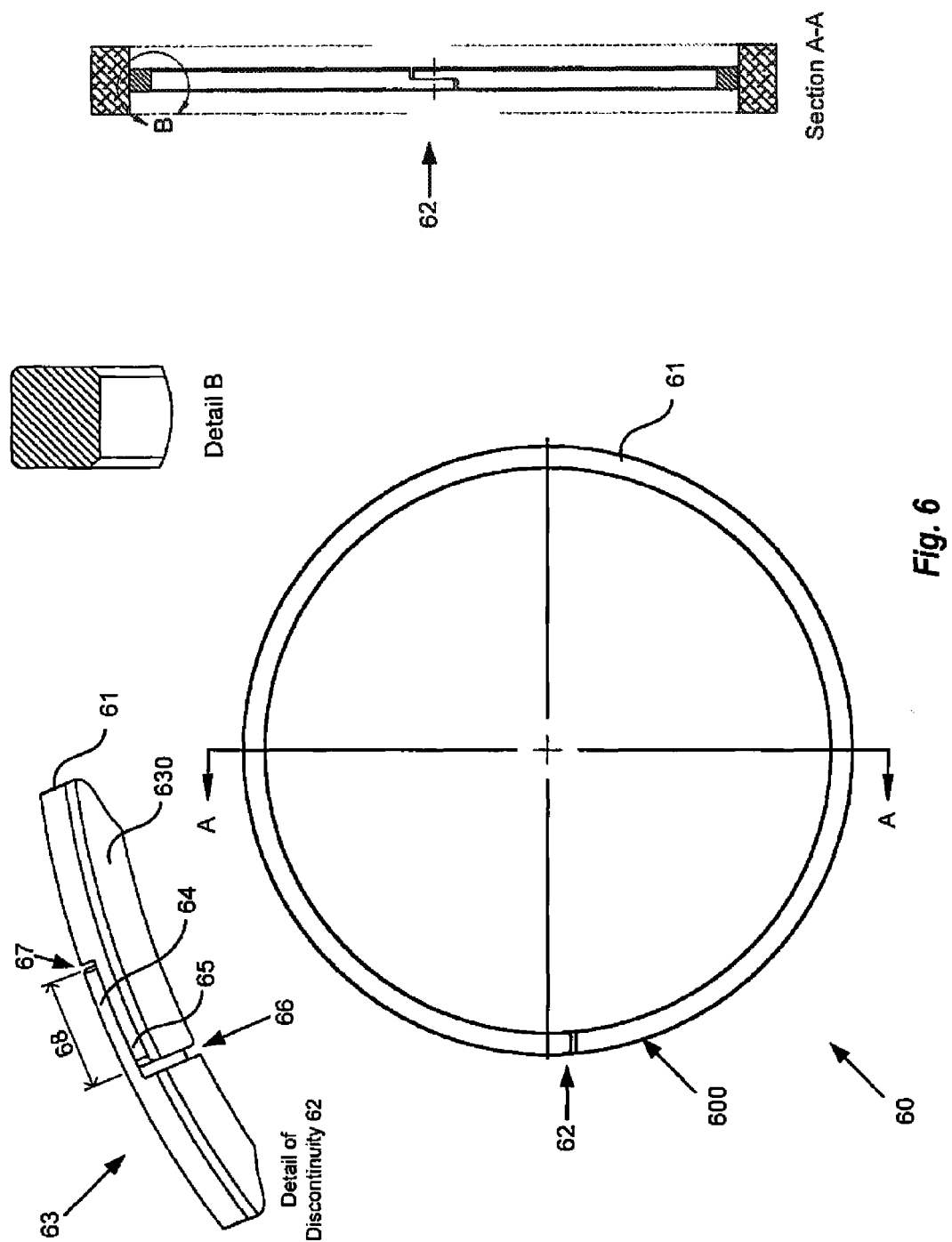
FIG. 6 shows a cross-sectional view of one embodiment of the annular seal suitable for installation in a groove of a seal plate.

As shown in FIG. 5A, some embodiments provide a square gap 50 in annulus 30. The shape of square gap 50 is obtained by providing squared ends 500 and 501 of annulus 30. Square gap 50 is aligned with a direction of flow (illustrated as arrowed line 58) of fluids through a filtration system. It will be appreciated that the square gap is also perpendicular to the radius of the seal plate and parallel to an axis 14 (FIGS. 1A-1C) of the seal plate 12. FIG. 5B illustrates an angled gap 52 in which the ends 520 and 521 of annulus 30 are cut at an angle selected to provide an overlap of the ends. The angle of cut used for ends 520 and 521 may be selected to accommodate the expected level of expansion/compression of seal ring 30 under operational temperature ranges. FIG. 5C shows a simplified compound gap 54. Annulus 30 has overlapping step-shaped ends 540 and 541 that are typically configured to provide an overlap regardless of whether the annulus 30 is under compression or at rest. Accordingly, compound gap 54 provides at least two gaps 542 and 544 that are offset along the circumference of annulus 30. Gaps 542 and 544 may be connected by a channel 543. Under typical operating pressures, gap provided by channel 543 is typically negligible, because ends 540 and 541 are typically forced into contact and consequently the width of channel 543 may be defined by the texture and planarity of the surfaces of ends 540 and 541 and the presence of discontinuities, grease, dirt or other particles on those surfaces. Accordingly, a configuration such as those shown in FIGS. 5B-5D may be referred to as discontinuities in the annulus because a gap may be effectively closed in these configurations under operating conditions. FIG. 6, which will be described in more detail below, depicts an embodiment of the invention comprising an annular seal 60 with a compound gap/discontinuity 62 in the shape of a step. As discussed below, the performance of annular seal 60 has been shown to meet or surpass the performance of an equivalent elastomeric seal under the same conditions. FIG. 5D shows a dual ring seal configuration 56 that can be used to minimize leakage. As shown, the annular seals of the dual ring configuration 56 have angular gaps 52, but square gap 50 and step gap 54 profiles can also be used as desired or required by the application.

From the perspective of process feed flow, gap 50, 52 or 54 presents a discontinuity in a seal ring 30 that can give rise to leakage, allowing process feed to flow "through" the seal ring 30. Accordingly, certain embodiments of the invention employ a plurality of seal rings 46, as shown in FIG. 4B (see also FIG. 5D), which are assembled to obtain a more complete seal. Various schemes for overlapping the seal ring may be used to ensure that gap size is minimized and/or maximizes resistance to flow of the process feed. For example, seal rings 421 and 422 may be angularly offset to eliminate or minimize respective gaps 32 in the seal rings 421 and 422. Offset in a multiple ring seal configuration may be maintained using registration elements such as a protrusion in a first seal ring 421 that mates with corresponding indentations in an adjacent seal ring 422. Other registration elements may engage with gaps 32 in the seal rings 421 and 422. In certain embodiments, an offset in the relative locations of gaps 32 in seal rings 421 and 422 may be maintained by permanently or temporarily bonding seal rings 421 and 422.

FIG. 6 depicts an embodiment of the present invention that can be configured for use in spiral membrane filtration systems. A substantially rigid annular seal 60 is fabricated from a hard polymer selected to withstand temperatures and pressures associated with filtration systems having 4, 8 or 16 inch filtration elements. The annulus 600 of seal 60 has a discontinuity 62 formed at the intersection of two overlapping step-shaped ends 64 and 65 of annulus 600, as depicted in detail 63. Before compression of annular seal 60, the steps of ends 64 and 65 partially overlap, leaving gaps 66 and 67 in surfaces (only surface 630 shown) on opposite sides of annulus 61. The distance of overlap 68 is selected to minimize leakage while maintain mechanical strength of annulus 61. Upon compression, gaps 66 and 67 tend to close, allowing the diameter of annular seal 60 to be reduced. For the purposes of this discussion, each end 64 and 65 is shown to have a single step. However, certain embodiments of the invention comprise an annulus that has multi-stepped ends 64 and 65. Annular seal 60 can be placed in a groove 16 in a seal plate 12 prior to insertion of the seal plate 12 into a housing 10. The step shaped discontinuity 62 in annular seal 60 allows reconfiguration of the annular geometry measurable as changes in radius and circumference of annular seal 60 when the annular seal 60 is compressed after the seal plate 12 is inserted into the housing. In certain embodiments, step profile discontinuity 62 may have a channel between gaps 66 and 67 prior to operation. When seal ring 60 is fitted to an groove 16 of a seal plate 10 and inserted within a housing 10, one or both of gaps 66 and 67 are reduced in size and when pressurized fluid flows through the filtration element, steps of ends 64 and 65 are pressed together closing any channel, with a net impact of improved sealing when under pressure.

With reference also to FIGS. 7A and 7B, certain embodiments comprise an offset step gap configuration, where each side of the gap has a compound and/or complex stepped configuration as shown generally at 70. Step configuration 70 can be constructed using two identical annular seals 72 and 73 that have a step gap 54 (see FIG. 5C). One of the two annular rings 72 flipped relative to the other seal ring 73 and the step gaps 54 are aligned. FIG. 7B illustrates one side 72 and 73 of each annular seal step gap 54 in detail. If not a single molded piece, the two annular seals can be bonded or glued to obtain the complex step configuration 70. As depicted, two different vertical risers 74 and 75 are used in the step. Accordingly, when flipped and bonded, overlaps are provided within the gap and a tortuous path is presented to fluid attempting to flow through the gap. This tortuous path can significantly reduce leakage through the gap. In some embodiments, an annular seal having the complex step gap of FIG. 7A can be provided in a molded ring or by machining and/or cutting a single ring 71 formed by extrusion, stamping or by other suitable means known to those with skill in the art.

FIG. 7C depicts, generally at 76, a variation of the stepped configuration by providing a step in both radial and axial directions. In the depicted example, one end 761 has a post 78 that is configured to fit a mating indentation or tunnel 77 in a second end 760 Typically, the post 78 rests within tunnel 77 and FIG. 7C shows ends 760 and 761 in a pulled-apart configuration. It will be appreciated that such "post-and-hole" and/or "pin-and-hole" configuration may provide improved axial and radial strength to the split ring seal, but may be susceptible to greater leakage or bypass flow.

In certain embodiments, a degree of bypass flow may be desirable to relieve and/or equalize pressure, particularly during system startup. It will be appreciated that certain conventional spiral elements are supplied with weep/bleed holes or grooves located within seal plate to create a controlled amount of flow past the conventional elastomeric seals. It will be appreciated that certain aspects of the invention remove the need for such holes and grooves because the described novel seals can be structured to obtained a desired degree of leakage within the seal itself. For this purpose the separation performance of the membrane element is used as the primary criterion. Therefore if two radial seals give substantially the same separation performance the amount of bypass flow can be assumed to be insignificant.

A plurality of seal rings may be mounted in the same groove 42 to minimize or eliminate leakage. Multiple split ring seals 46 can be included within the grooved depression 42 of the seal plate 40 as shown in detail in FIG. 4B, in which two adjacent rings 46 reside within the groove 42 of the seal plate 40. As shown in FIG. 5D, the gaps 54 and 56 of adjacent rings can be oriented in opposite directions. The combination of multiple rings 30 and the design of gap overlap can provide an effective measure of control over amount of flow that can pass through combinations of ring gaps 32. Overlap can be maintained using registration methods that serve to lock two or more rings 30 with respect to one another and/or with respect to the groove 42 of the seal plate 40. Registration may be used to ensure that gaps 42 do not line up through the depth of the entire seal. Registration may be maintained using hydrodynamic surfaces, pins and holes, bumps and dents, friction, slots, grooves and other such methods. In one example, a raised surface, pin or tab may be provided on a surface of one ring that can engage the gap of a neighboring ring such that the gaps of the two rings are misaligned and have no overlap.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by this disclosure.

Certain embodiments of the invention provide a radial seal for a filtration system. Some of these embodiments comprise one or more annulus having an outer circumference and an inner circumference and a thickness. In some of these embodiments, each annulus has a diameter of the inner circumference selected to fit in a groove in an outer surface of a seal plate. In some of these embodiments, each annulus has a diameter of the outer circumference selected to be larger than the diameter of an inner surface of a cylindrical housing that receives the seal plate. In some of these embodiments, each annulus has a gap in the annulus of the ring centered along a radius of the at least one annulus. In some of these embodiments, this gap has a width selected to enable the annular element to deform sufficiently to permit insertion of the at least one annulus into the cylindrical housing.

In some of these embodiments, the inner and outer diameters of the annuli and the width of the gap are selected to obtain a tight fit between the outer circumference of the at least one annulus and the inner surface of the cylindrical housing. In some of these embodiments, a tight fit is maintained by a restoring force reactive to compression of the annular element. In some of these embodiments, the magnitude of the restoring force is related to the width of the gap and the materials used to fabricate the at least one annulus. In some of these embodiments, the width of the gap is selected to permit a maximum degree of leakage when an annulus is installed in the groove and the seal plate is inserted in the cylindrical housing.

In some of these embodiments, the seal comprises two or more annuli. In some of these embodiments, the annuli are configured such that the gaps of the annuli are misaligned when the annuli are installed in the groove, thereby minimizing leakage in operation. Some of these embodiments comprise a registration system. In some of these embodiments, each annulus in a pair of adjacent annuli includes a registration element that cooperates with a registration element of the other annulus to ensure misalignment of the gaps of the pair of annuli. In some of these embodiments, the registration system comprises a raised element provided on a surface of one of pair of annuli that fits in the gap of an adjacent annulus. In some of these embodiments, the registration system comprises a raised element provided on a surface of one of pair of annuli that fits in a groove provided on a surface of an adjacent annulus. In some of these embodiments, an annulus is fabricated from a metal. In some of these embodiments, at least one annulus is fabricated from a polymer.

Certain embodiments of the invention provide systems and methods for sealing a spiral membrane element inserted into a cylindrical housing of a filtration system. Some of these embodiments comprise a step of providing at least one split ring seal in a groove located on an outer surface of a seal plate of the spiral membrane element. In some of these embodiments, the split ring seal has an outer diameter exceeding the diameter of an inner surface of the cylindrical housing. Some of these embodiments comprise the step of inserting the seal ring into the cylindrical housing. In some of these embodiments, inserting the seal ring includes a step of compressing the at least one split ring seal.

In some of these embodiments, a gap in the split ring has a width selected to enable the annular element to deform in response to the compressing step sufficient to enable the at least one split ring seal to fit within the cylindrical housing. In some of these embodiments, the width of the gap is selected to permit a maximum degree of leakage when the at least one annulus is installed in the groove and the seal plate is inserted in the cylindrical housing. In some of these embodiments, the at least one split ring seal comprises a plurality of split ring seals. Some of these embodiments comprise the step of aligning each of the plurality of split ring seals to avoid an overlap of gaps of adjacent split rings, thereby minimizing leakage in operation. In some of these embodiments, the step of aligning includes using registration elements provided on each split ring seal to configure the alignment of adjacent pairs of spilt ring seals. In some of these embodiments, the registration elements include one or more of a groove, a pin, a hole and a slot.

Certain embodiments of the invention provide a split-ring seal for maintaining a seal between a filtration element and a housing of a filtration system. Certain of these embodiments comprise a rigid annulus having a discontinuity therein. In certain embodiments, the annulus has an inner diameter selected to allow the annulus to fit a groove provided in an outer surface of the filtration element. In certain embodiments, the annulus has an outer diameter is selected to be larger than the diameter of an inner surface of the housing. In certain embodiments, the discontinuity accommodates a reduction of inner and outer diameters of the annulus in response to a compressive force received during insertion of the filtration element into the housing. In certain embodiments, the annulus is configured to resist changes in its cross-sectional profile in response to the compressive force. In certain embodiments, the discontinuity comprises a step shaped channel in the annulus wherein the step shaped channel is substantially closed under pressure of an axial flow of fluid through the filtration system. In certain embodiments, the discontinuity is formed by the overlap of two step shaped ends formed in the annulus. In certain embodiments, the annulus is configured to maintain the seal between the filtration element and the housing and to resist an axial flow of fluid through the filtration system regardless of direction of the axial flow. In certain embodiments, the seal operates to resist bypass of a fluid around the filtration element and into a space between the filtration element and the housing during filtration. In certain embodiments, the seal operates to resist bypass of a flushing fluid around the filtration element and into the space between the filtration element and the housing during cleaning.

Certain embodiments of the invention comprise a seal ring having some combination of the above-described elements. The seal ring may be deployed within a filtration element in a filtration system used to filter and/or treat water, waste water, storm water, potable and non-potable water, and juices. Filtration system may comprise a spiral membrane filtration system, a reverse osmosis system for home or commercial use and or other filtration system that houses a filtration element in a pipe, canister, or other vessel or conduit. In some embodiments, the filtration system may be used for filtering and treating other fluids in chemical and industrial applications.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A filtration system comprising:
 a cylindrical housing; and
 spiral membrane elements inserted into the cylindrical housing, wherein a given spiral membrane element has a membrane wound in a spiral, a seal plate having a groove located on an outer surface of the seal plate, and at least one split ring seal placed in the groove, the split ring seal including an annulus and a gap, and the given spiral membrane element can be moved along an axis of the cylindrical housing in either direction.

2. The filtration system according to claim 1, wherein the spiral membrane element can be moved along an axis of the cylindrical housing in either direction without destruction of the split-ring seal.

3. The filtration system according to claim 1, wherein a leakage through the split ring seal is allowed.

4. The filtration system according to claim 1, wherein a plurality of split ring seals is placed in the groove.

5. The filtration system of claim 4, wherein individual ones of the plurality of the split ring seals are aligned to avoid an overlap of gaps of adjacent split rings.

6. A spiral membrane element comprising:
 a membrane wound in a spiral;
 a seal plate having a groove located on an outer surface of the seal plate; and
 at least one split ring seal placed in the groove, the split ring seal including an annulus and a gap.

7. The spiral membrane element according to claim 6, wherein the gap having a width selected to enable the annulus to deform.

8. The spiral membrane element according to claim 6, wherein a plurality of the split ring seals is placed in the groove.

9. The spiral membrane element according to claim 7, wherein individual ones of the plurality of split ring seals are aligned to avoid an overlap of gaps of adjacent split rings.

10. The spiral membrane element of claim 2, wherein the split ring seal is constructed from a non-elastomeric material.

* * * * *